No. 780,218. PATENTED JAN. 17, 1905.
W. McCLOSKEY.
CULTIVATOR.
APPLICATION FILED MAY 2, 1904.
2 SHEETS—SHEET 1.
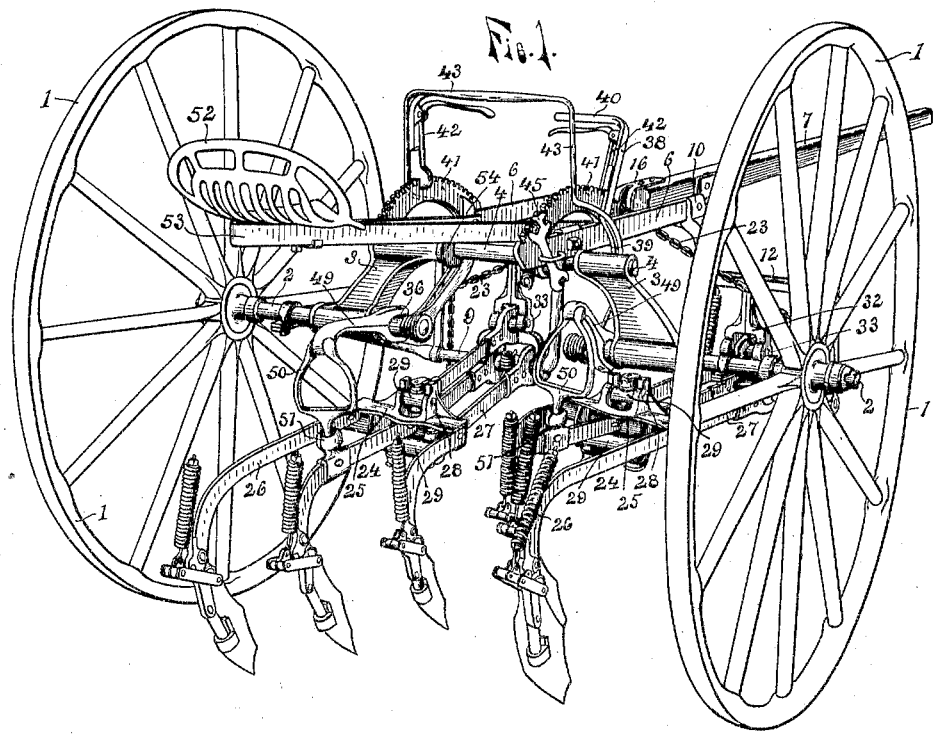
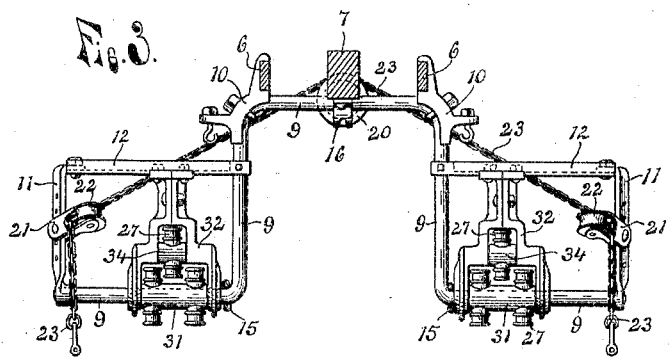
WITNESSES.
M. E. Scully
B. Scully
INVENTOR.
William McCloskey
By Edmund J. Scully
Attorney.

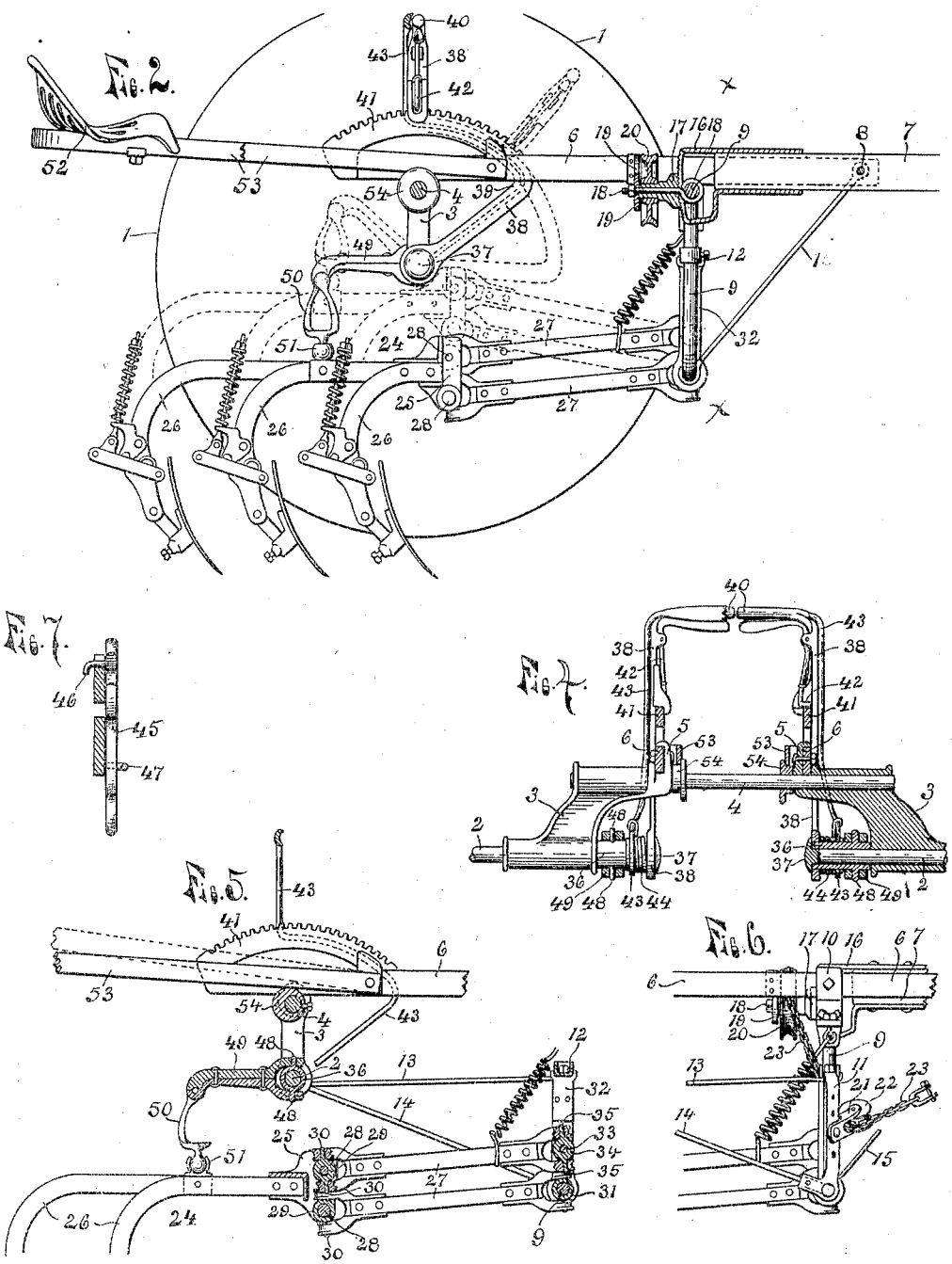

No. 780,218.

Patented January 17, 1905.

UNITED STATES PATENT OFFICE.

WILLIAM McCLOSKEY, OF ESSEX, CANADA, ASSIGNOR OF ONE-HALF TO EDMUND I. SCULLY, OF WINDSOR, CANADA.

CULTIVATOR.

SPECIFICATION forming part of Letters Patent No. 780,218, dated January 17, 1905.

Application filed May 2, 1904. Serial No. 205,906.

*To all whom it may concern:*

Be it known that I, WILLIAM MCCLOSKEY, a citizen of Canada, residing at Essex, in the county of Essex and Province of Ontario, Canada, have invented certain new and useful Improvements in Cultivators, of which the following is a specification.

This invention relates to improvements in cultivators, and especially to that class known as "sulky-cultivators," in which the shovels or teeth are arranged in gangs upon frames independently attached to the carrying-frame of the cultivator to move both vertically and horizontally.

The object of the invention is to provide improved means for raising and supporting the gang-frames and for permitting the lateral movement thereof and also to pivotally attach each gang-frame to the cultivator-frame in such manner that the shovels of each gang will always be in horizontal alinement and in parallelism with the line of advancement of the cultivator regardless of whether the frames are raised or lowered or whether moved toward or from each other.

It is also an object of the invention to provide suitable means for equalizing the draft when one horse gets behind the other in addition to providing the advantages of the particular construction and combination of parts, all as hereinafter more fully described, reference being had to the accompanying drawings, in which—

Figure 1 is a perspective view of a device embodying the invention. Fig. 2 is a longitudinal vertical section of the same. Fig. 3 is a section on the line $x$ $x$ of Fig. 2. Fig. 4 is a detail showing the lever mechanism with parts in section. Fig. 5 is a detail showing the pivotal connection of the draft-bars in section, together with the arm for raising the gang-frame and adjacent parts. Fig. 6 is a detail showing a side elevation of a portion of the forward end of the cultivator, and Fig. 7 is a detail showing the manner in which the wrench is attached to the sector to form a stop for the lever.

As shown in the drawings, 1 1 are the ordinary supporting-wheels, journaled on the outer ends of the divided axle 2, the inner ends of said axle being connected by providing castings 3, each having a bearing through which one-half of the axle is passed and secured therein, and each casting is also provided with a bearing at its upper end within which the connecting shaft or strut 4 is secured, the divided axle, casting, and strut together forming an arched axle. Integral with the castings 3 at their adjacent sides are the clips 5, which embrace the side bars 6 of the cultivator-frame, said bars being secured within the clips with their lower edges resting on the strut 4 by bolts passing through the clips and bars and extending forward they converge and are secured to the sides of the tongue 7 by a bolt 8 passing through the bars and tongue. A draft-yoke 9 is secured to the lower edges of the bars 6 at a short distance to the rear of the tongue by suitable clips 10 and extending vertically downward at each side from these clips is bent at right angles and extends horizontally outward to near each wheel. To the outer ends of the draft-yoke are secured the vertical draft-bars 11, which are provided with sockets at their lower ends to receive the ends of the yoke, and to their upper ends are secured channel-bars 12, which extend parallel with the horizontal end portions of the yoke and are provided with eyes to receive the yoke, to the vertical portions of which these bars are secured. The draft-yoke is braced and held in its vertical position by the draft-rods 13 and 14, which are secured at one end to the axle 2 and at their opposite ends to the upper and lower ends of the draft-bar 11, respectively, and also by the brace-rods 15, which are provided at their ends with eyes to receive the yoke and the bolt 8, respectively.

The tongue 7 is pivotally secured to the frame by the bolt 8 and is held at any angle to the bars 6, to which it may be adjusted by providing a loop 16, which is secured to the rear end of the tongue and embraces the draft-yoke, said loop being clamped between the yoke and a block 17 by a bolt 18, secured at one end to the yoke and passed through a vertical slot in the loop and an opening in the block. The end of the block is supported by a transverse bar 19, through which the bolt 18 passes, and a nut on the end of the bolt when turned up against the bar draws the parts together and holds the tongue in the position to which it is adjusted. The block 17 is turned down to form a bearing for the pulley-wheel 20, which is loosely mounted thereon, and pivotally attached to the draft-bars 11 are the yokes 21, carrying the pulleys 22, said yokes being vertically adjustable on the draft-bars by providing a series of holes in each bar. Engaging these pulleys 20 and 22 is a chain 23, to the ends of which whiffle-trees are attached, said chain running freely over the pulleys and forming a draft-equalizer which prevents one horse from shirking his share of the work by lagging behind the other, the slack in the chain being taken up by the other horse.

24 represents two independent shovel or gang frames each consisting of a casting forming a frame-head 25, to which the forward ends of the rearwardly and downwardly extending shovel-bars 26 are securely fastened, the shovel-blades being attached to the lower end of each of said bars. To connect these frames with the horizontal end portions of the draft-yoke 9, the draw-bars 27 are provided, three for each of said frames, two of which are located side by side in the same horizontal plane and at a distance apart and the other a distance above these two, parallel with them and equidistant from each. These draw-bars are pivotally connected to the head 25 by providing said heads with transverse pivot-pins 28, upon which are the sleeves 29, free to turn thereon and having pintles 30, which engage openings in the forked ends of said draw-bars. The forward ends of the draw-bars are pivotally attached to the draft-yoke 9 by slipping sleeves 31 over the horizontal ends of said yoke and also providing suitable castings 32, having downwardly-projecting arms provided with openings to receive the ends of the yoke, between the arms of each of which castings one of the sleeves 31 is located, and at their upper ends these castings are detachably secured to the channel-bars 12. Each of the castings 32 is also provided with a transverse pivot-pin 33, upon which is sleeved a second sleeve 34, having pintles 35 for the attachment of the upper draw-bar, the lower sleeve 31 being also provided with pintles for the attachment of the two lower bars. These pivotal connections of the draw-bars with the yoke and gang-frames allows said frames to be raised vertically, the sleeves turning for that purpose, and also allows the frames to be moved laterally, the bars turning on the pintles. The two lower draw-bars of each set being parallel and in the same horizontal plane, when the gang-frame is moved laterally it will be held by said bars in parallelism with the line of advancement of the cultivator, and when the gang-frame is raised or lowered the upper bar holds the frame in a horizontal position at all times.

The inner ends of the two parts of the divided axle 2 are extended inward through the castings 3, and on these inwardly-extending ends are secured the sleeves 36 by forming heads 37 on the ends of the axle. These sleeves are free to turn on the axle, and to their inner ends are rigidly secured the hand-levers 38, which extend upward therefrom just outside the side bars 6 of the frame with an abrupt forward bend 39 and at their upper end are bent laterally toward each other, meeting at the center of the machine and forming horizontal handle-grips 40. Sectors 41 are secured to the bars 6 directly above the axle, and carried by each lever 38 is a latch 42 to engage with the notches of the sector and hold the lever in any position to which it may be adjusted, each latch being operated by a grip portion lying adjacent to the handle of the lever. By taking hold of the handles at the center the operator may with one hand operate both levers, which may be moved toward the operator to the end of the sector, the forward bend in the levers allowing such movement, as it conforms to the curve of the sectors, the lever passing over the axle as it is moved toward the operator.

An alinement-lever 43 is pivotally attached at its ends to the sleeves 36 and is free to turn thereon, said lever extending upward with a forward bend similar to that of the hand-levers and across in alinement with the handles of said levers at the rear thereof. Springs 44 are wound on the sleeves with one end secured thereto and the other engaging the alinement-lever to exert a force to throw said lever forward, so that it will always be held against one or both of the hand-levers in a position to form a rest and guide for the operator's hand, and if one hand-lever is adjusted to the rear of the other when the lever at the rear is released it will tend to force said lever into alinement with the forward one. When the operator has determined the depth at which he wishes the shovels to run, it is desirable to have an adjustable stop for the levers, which stop may be set to limit the movement of the levers, and thus the operator will not be obliged to keep in mind the particular notches of the sectors with which he wishes to engage the latches each time after raising the shovel-frames for turning at the end of the row. As a simple and convenient device for this purpose an ordinary cast wrench 45 (which must be carried on the machine in some way) is employed, said wrench being provided with a hook 46, which projects outward from one side thereof and is adapted to be engaged with one of the notches of the sector, and on the side of one of the bars 6 is provided a loop 47 to receive the handle of the wrench and hold the same in place. The hook may be engaged with any of the notches adjacent to the loop desired, and the throw of the alinement-lever will thus be limited by coming into contact with the wrench, and the same notch of the sector will be engaged by the latch each time.

The sleeves 36 are each provided with two integral pintles 48, and arms 49 are each pivotally secured to one of the sleeves by being forked at its rear end and provided with ears to engage said pintles upon which the arm is free to turn. The said arm is made in halves, riveted together, to facilitate the engagement of the ears with the pintles. The outer end of each arm is curved slightly downward and provided with a bearing, within which bearing the stirrup 50 is pivotally secured at its upper end, its lower end being connected to one of the shovel-frames by a universal joint 51, consisting of a ball formed on the lower side of the stirrup and a socket made in halves to embrace the ball. Each half of the socket is provided with one-half of a clip to embrace one of the shovel-bars, to which bar the clip is secured by a bolt passing through the clip and bar. The vertical movement of the shovel-frames is thus controlled by the hand-levers 38, as the sleeves 36 cannot turn except when the levers are moved, and the stirrups form rigid connections between the arms 49 and said frames. The said frames are free to move laterally, however, as the said arms turn freely upon the pintles on the sleeves, and the universal joints allow the stirrups to rotate relative to the frame. Therefore the shovel-frames are supported by said arms at all times, and consequently the frames may be very easily swung from side to side to follow the windings of the row of plants and are easily raised, owing to the relative lengths of the arms 49 and hand-levers 38.

The driver's seat 52 is adjustably secured to the rearwardly-extending bars 53, which are pivotally secured to the side bars 6 of the frames forward of the axle or strut 4, upon which strut are sleeved two cam members 54, upon the cam-faces of which the bars rest. To raise or lower the seat, these members are turned on the strut 4 to bring the larger or smaller portion of the cam in contact with the bar, in which position it is held by a set-screw, thus providing a very cheap and convenient means for adjusting the height of the seat.

What I claim as my invention, and desire to secure by Letters Patent, is—

1. In a cultivator the combination with the supporting-wheels and frame thereof, of shovel-frames, a draft-yoke having horizontally-extended ends, vertical draft-bars secured to the outer ends of the yoke and provided with sockets, castings adjustably secured to said ends to which castings the shovel-frames are pivotally attached, whereby the forward ends of said frames may be adjusted toward or from each other.

2. In a cultivator the combination with the supporting-wheels and frame thereof, of shovel-frames, a draft-yoke secured to the lower edges of the side bars of the frame and having horizontally-extended ends, vertical draft-bars secured to the ends of the yoke and having sockets, channel-bars secured to the upper ends of said draft-bars at one end and to the vertical portions of the draft-yoke at their opposite ends, castings having eyes to receive the horizontal ends of the yoke and adjustably secured at their upper ends to the channel-bars, draft-bars pivotally secured at one end to the castings and at their opposite ends to the frames.

3. In a cultivator the combination with the supporting-wheels and frame thereof, of shovel-frames having heads provided with horizontal bearing-pins, sleeves on said pins provided with pintles, parallel draw-bars having forked ends provided with eyes to engage said pintles, a draft-yoke having horizontally-extended ends, castings having arms provided with eyes to receive said ends of the yoke, sleeves loosely mounted on said yoke between said arms, a horizontal bearing-pin on each casting, sleeves on said pins, pintles on the sleeves, forked forward ends on the draw-bars provided with eyes to engage the pintles, vertical draft-bars secured to the ends of said draft-yoke, and bars secured to the upper ends of said draft-bars at one end and at their opposite ends to the vertical portions of the yoke and to which the upper ends of said castings are adjustably secured.

4. In a sulky-cultivator the combination with the supporting-wheels and arched axle, of side bars secured to the axle, rearwardly-extending bars pivotally secured to the side bars forward of the axle, a seat secured to said bars, members sleeved on the axle each having a cam-face upon which the bars are supported, and means for securing the members to the axle.

5. In a sulky-cultivator the combination with the supporting-wheels and frame thereof, of seat-bars pivotally attached at one end to the frame, a seat on said bars, and cam members supporting said bars and adapted to be turned to raise or lower the seat.

6. In a cultivator the combination with the supporting-wheels and frame, of a shovel-frame, an arm secured to the frame at one end to turn thereon, a connection pivotally attached to the arm and shovel-frame, and means whereby the said arm is permitted to move laterally with the lateral movement of the shovel-frame.

7. In a cultivator the combination with the supporting-wheels and frame thereof, of a shovel-frame, an arm pivotally attached to the shovel-frame at one end to turn upon a horizontal axis and also to turn upon a vertical axis, a rigid connection pivotally attached at one end to the end of said arm and at its opposite end to the shovel-frame, and means for turning said arm on its horizontal axis to raise and lower the shovel-frame.

8. In a cultivator the combination with the supporting-wheels and axle, of a shovel-frame, a sleeve on the axle, an arm on said sleeve, a rigid connection pivoted to the end of said arm at one end and to the shovel-frame at its opposite end, and means for turning said sleeve to raise and lower the shovel-frame.

9. In a cultivator the combination with the supporting-wheels and axle, of independently-movable shovel-frames, sleeves on the axle-arms attached to said sleeves to move laterally, rigid connections pivoted at their upper ends to the ends of said arms and at their lower ends to said shovel-frames, and means for turning said sleeves on the axle.

10. In a cultivator the combination with the supporting-wheels and frame thereof, of independently-movable shovel-frames, arms pivotally attached at one end to the frame to turn upon a horizontal axis and also upon a vertical axis, rigid connections provided with a universal joint between said arms and shovel-frames, and means for operating said arms.

11. In a cultivator the combination with the supporting-wheels and axle, of independently-movable shovel-frames, sleeves on said axle, arms having forked ends embracing said sleeves and pivotally secured thereto, stirrups pivotally attached at their upper ends to the outer ends of said arms and attached at their lower ends to the shovel-frames by a universal joint, and means for turning said sleeves.

12. In a cultivator the combination with the supporting-wheels and axle, of independently-movable shovel-frames, sleeves on said axle having outwardly-extending pintles, arms having forked ends provided with openings to receive said pintles, stirrups pivoted to the outer ends of said arms each provided with a ball at its opposite end, sockets secured to the shovel-frames to receive the balls and hand-levers to turn said sleeves.

13. In a cultivator the combination with the supporting-wheels, frame and axle, of shovel-frames, sleeves on the axle, means for raising and lowering said shovel-frames pivotally secured to said sleeves, hand-levers secured to said sleeves and extending upward therefrom and bent laterally toward each other at their upper ends, sectors on the cultivator-frame, latches carried by said hand-levers, an alinement-lever pivoted to turn upon the same axis as the hand-levers and extending horizontally in alinement with the laterally-bent ends of the hand-levers, and a spring to hold the alinement-lever in contact with one of the hand-levers.

14. In a cultivator the combination with the supporting-wheels axle and frame, of independently-movable shovel-frames, hand-levers pivoted on the axle, means connecting said levers and the shovel-frames to raise said frames, an alinement-lever pivoted on the axle, sectors on the frame, latches on the hand-levers, a wrench having a hook to engage the notches of one of the sectors, and a loop on the frame to receive the wrench.

In testimony whereof I have signed my name to this specification in presence of two witnesses.

WILLIAM McCLOSKEY.

Witnesses:
A. G. A. LEGGATT,
E. I. SCULLY.